United States Patent [19]

Kuroda et al.

[11] Patent Number: 5,332,518
[45] Date of Patent: Jul. 26, 1994

[54] STABLE SLURRY-COATED SODIUM PERCARBONATE, PROCESS FOR PRODUCING THE SAME AND BLEACH DETERGENT COMPOSITION CONTAINING THE SAME

[75] Inventors: Mutsumi Kuroda; Akira Suzuki, both of Tochigi; Hideo Kikuchi; Masahiro Saito, both of Fukushima; Nobuyoshi Yamaguchi, Wakayama, all of Japan

[73] Assignees: Kao Corporation; Nippon Peroxide Co., Ltd., both of Tokyo, Japan

[21] Appl. No.: 43,907

[22] Filed: Apr. 7, 1993

[30] Foreign Application Priority Data

Apr. 23, 1992 [JP] Japan ................................. 4-104504

[51] Int. Cl.$^5$ ..................... C11D 3/04; C11D 3/395; C11D 11/00; C11D 17/06
[52] U.S. Cl. ..................................... 252/99; 252/89.1; 252/102; 252/174.13; 252/174.14; 252/174.16; 252/174.24; 252/186.27; 252/186.32; 423/415.2
[58] Field of Search .................... 252/94, 95, 99, 102, 252/174.13, 186.27, 186.32, 89.1, 174.14, 174.16, 174.24; 423/415 P

[56] References Cited

U.S. PATENT DOCUMENTS

| 2,380,620 | 7/1945 | Walters | 423/415 P |
|---|---|---|---|
| 3,640,885 | 2/1972 | Rhees | 252/186.32 |
| 3,883,640 | 5/1975 | Smart | 423/415 P |
| 4,075,116 | 2/1978 | Mesaros | 252/102 |
| 4,321,301 | 3/1982 | Brichard | 252/99 |
| 4,526,698 | 7/1985 | Kuroda | 252/99 |
| 5,194,176 | 3/1993 | Copenhafer | 252/186.27 |

FOREIGN PATENT DOCUMENTS

| 0405797A1 | 1/1991 | European Pat. Off. . |
|---|---|---|
| 0407981A1 | 1/1991 | European Pat. Off. . |
| 2748783B2 | 5/1979 | Fed. Rep. of Germany . |
| 138191 | 10/1979 | Fed. Rep. of Germany ... 423/415 P |
| 2528447 | 12/1983 | France . |
| 57-67007 | 4/1982 | Japan ............................. 423/415 P |

OTHER PUBLICATIONS

Chemical Abstracts, vol. 102, Mar. 25, 1985, No. 12, pp. 1 and 86.

Primary Examiner—Dennis Albrecht
Attorney, Agent, or Firm—Birch, Stewart, Kolasch & Birch

[57] ABSTRACT

A stable sodium percarbonate having excellent stability when incorporated into a bleaching agent composition or a detergent composition, particularly a zeolite-containing detergent composition. The stable sodium percarbonate is produced by a process which comprises a step of treating sodium percarbonate on the surface with at least one coating agent selected from the group (A) consisting of boric acids, borates and alkali metal silicates and at least one coating agent selected from the group (B) consisting of carbonates, hydrogencarbonates and sulfates, and at least one coating agent selected from the group consisting of coating agents belonging to groups (A) and (B) being present in the form of an aqueous coating slurry thereof.

29 Claims, No Drawings

STABLE SLURRY-COATED SODIUM PERCARBONATE, PROCESS FOR PRODUCING THE SAME AND BLEACH DETERGENT COMPOSITION CONTAINING THE SAME

BACKGROUND OF THE INVENTION

1. Field of the Invention

The present invention relates to a process for producing sodium percarbonate having excellent stability and storability; sodium percarbonate prepared by this process and a bleach detergent composition containing the sodium percarbonate. In particular, the present invention relates to a process for producing sodium percarbonate suitable for incorporation into a bleaching agent composition as a main component or a detergent composition, which comprises the step of treating the surfaces of sodium percarbonate particles with specific coating agents used in the form of an aqueous slurry.

2. Description of the Related Art

Sodium percarbonate is well known as a base component which is incorporated into an oxygenic bleaching agent composition or a sterilizer composition, or as an oxidizer per se. Sodium percarbonate, which is usually produced by reacting sodium carbonate with hydrogen peroxide, is represented by the formula: $2Na_2CO_3 \cdot 3H_2O_2$ and comprises a sodium carbonate/hydrogen peroxide adduct. Sodium percarbonate is widely used in household or business bleaching agent compositions, since it is usable for bleaching colored or patterned cloths and it does not impair or yellow the cloth, though its bleaching power is slightly less than that of chloric bleaching agents at ambient temperature.

Another reason why sodium percarbonate attracts attention is that the decomposition products of this compound are free from any environmental pollution and therefore there is no problem of environmental pollution due to, for example, waste water.

However, sodium percarbonate is unstable and has problems such that the activity thereof is reduced during storage. In addition, when a very small amount of metals such as iron or copper are present as impurities, they act as a catalyst to accelerate a reduction in the activity of the sodium percarbonate. Further, since a problem of environmental pollution is created in semi-closed water areas, detergent compositions containing little or no phosphorus and in which synthetic zeolites instead of phosphorous compounds are utilized as a detergent builder, are recently in wide use. However, since zeolites also act as a catalyst to accelerate a reduction in the activity of sodium percarbonate, sodium percarbonate is extremely unstable in detergent compositions containing zeolite. That is, sodium percarbonate is catalytically decomposed by zeolite to rapidly lose available oxygen.

Sodium perborate is also utilized as a base component of oxygenic bleaching agent compositions other than sodium percarbonate. Although sodium perborate can be incorporated into detergent compositions or the like to form a relatively stable composition, it must be used at high temperatures, since its dissolution velocity in water is low. Thus sodium perborate is seldom used as a base component of an oxygenic bleaching agent composition in countries wherein low-temperature water is used for the washing of clothes and other works with water.

When sodium percarbonate having a high solubility at low temperature can be incorporated into a detergent composition to obtain a stable composition, bleaching and washing can be advantageously conducted at the same time, so that the development of a technique for improving the storability of sodium percarbonate is eagerly sought.

Various investigations have been made and various processes have been proposed for the stabilization of sodium percarbonate. For example, British Patent No. 1,575,792 (published on Oct. 1, 1980) discloses the use of boric acids, e.g., orthoboric acid, metaboric acid and tetraboric acid as coating agents for peroxides; and U.S. Pat. No. 4,526,698 (patented on Jul. 2, 1985; assignee: Kao Corp.) discloses the use of an aqueous borate solution to coat sodium percarbonate, and the coating of sodium percarbonate with an aqueous composite coating agent solution containing a borate and a silicate. Further, this U.S. Patent also discloses a process which comprises using an aqueous composite coating agent solution containing the above-described coating agents and sodium carbonate or the like as a second or third component, which is added and dissolved therein, to coat sodium percarbonate and spraying sodium percarbonate with the aqueous composite coating agent solution.

Sodium percarbonate produced by the process disclosed in British Patent No. 1,575,792, among the techniques of stabilizing sodium percarbonate, is still insufficient in its storability, coating strength and solubility. Further, although sodium percarbonate produced by the process described in U.S. Pat. No. 4,526,698 exhibits a remarkably improved storability when it is incorporated into a detergent composition, its storability is not yet comparable to that of sodium perborate and thus is not always satisfactory.

Investigations have been made also on a bleach detergent composition containing coated sodium percarbonate. For example, a bleach detergent composition containing sodium percarbonate having the surface coated with a borate-containing coating agent composition is described in the above-described U.S. Pat. No. 4,526,698. Further, it is described therein that the method for coating the surface of sodium percarbonate to be incorporated into the bleach detergent composition is not limited, and in an Example given therein, sodium percarbonate is coated with an aqueous borate solution.

DISCLOSURE OF THE INVENTION

Summary of the Invention

After extensive investigations made for the purpose of producing sodium percarbonate having excellent storability, namely, for the purpose of producing sodium percarbonate which exhibits a storability similar or superior to that of sodium perborate when it is incorporated into a bleaching agent composition or a detergent composition, particularly, a detergent composition containing zeolite, the inventors have found that this purpose can be attained by improving the coating method. The present invention has been completed on the basis of this finding.

Thus the present invention relates to a process for producing a stable sodium percarbonate, which comprises a step of treating sodium percarbonate on the surface with at least one coating agent selected from the group (A) consisting of boric acids, borates and alkali metal silicates and at least one coating agent selected from the group (B) consisting of carbonates, hydrogencarbonates and sulfates, and at least one coating agent selected from the group consisting of coating agents belonging to groups (A) and (B) being present in the form of an aqueous coating slurry thereof.

Namely, the present relate to a process for producing a stable sodium percarbonate which comprises a surface coating step of sodium percarbonate with an aqueous coating slurry, said surface coating step being conducted with a coating agent selected from the group (A) consisting of boric acids, borates and alkali metal silicates and a coating agent selected from the group (B) consisting of carbonates, hydrogencarbonates and sulfates, and at least one coating agent selected from the group consisting of coating agents belonging to groups (A) and (B) being used as a dispersoid of the aqueous coating slurry.

In other words, the present invention relate to a process for producing a stable sodium percarbonate, which comprises a step of treating sodium percarbonate on the surface with a coating agent composition(s) containing at least one coating agent selected from the group (A) consisting of boric acids, borates and alkali metal silicates and at least one coating agent selected from the group (B) consisting of carbonates, hydrogencarbonates and sulfates, and at least one of the coating agent composition(s) being in the form of an aqueous coating slurry of at least one coating agent selected from the group consisting of coating agents belonging to groups (A) and (B).

In the process according to the present invention, the aqueous coating slurry has preferably a water content of 30 to 90% by weight.

In the process according to the present invention, the step(s) of treating sodium percarbonate is advantageously effected so that sodium percarbonate is coated with coating agents belonging to groups (A) and (B).

In the process according to the present invention, the step of treating sodium percarbonate on the surface is conducted with a coating agent composition(s) selected from the group consisting of:

(1) an aqueous slurry comprising coating agents belonging to groups (A) and (B), and at least one of the coating agents being a dispersoid of the aqueous slurry;

(2) an aqueous slurry of a coating agent(s) belonging to group (A) and an aqueous solution of a coating agent(s) belonging to group (B);

(3) an aqueous slurry of a coating agent(s) belonging to group (B) and an aqueous solution of a coating agent(s) belonging to group (A);

(4) an aqueous slurry of a coating agent(s) belonging to group (A) and an aqueous slurry of a coating agent(s) belonging to group (B);

(5) an aqueous slurry of a coating agent(s) belonging to group (A) and powder of a coating agent(s) belonging to group (B); and (6) an aqueous slurry of a coating agent(s) belonging to group (B) and powder of a coating agent(s) belonging to group (A), with the proviso that when two coating agent compositions are employed, the order of the treatment with the coating agent compositions is not limited.

The process according to the present invention comprises preferably conducting the step of treating sodium percarbonate with an aqueous coating slurry which comprises a coating agent belonging to group (A), a coating agent belonging to group (B) and water, has a water content of 30 to 90% by weight based on the entire quantity of the aqueous coating slurry and contains, as a dispersoid of the aqueous coating slurry, at least one coating agent selected from the group consisting of coating agents belonging groups (A) and (B).

In the above-described preferable embodiment of the present invention, the coating agent belonging to group (A) is advantageously selected from the group consisting of borates and alkali metal silicates.

Namely, the process according to the present invention includes a process for producing stable sodium percarbonate, characterized by selecting at least one coating agent from each of the following groups (A) and (B), mixing both agents with water to form a coating slurry having a water content of 30 to 90% by weight and coating the surface of sodium percarbonate with the coating slurry:

group (A): borates and alkali metal silicates, and group (B): carbonates, hydrogencarbonates and sulfates.

The process according to the present invention comprises preferably conducting the step of treating sodium percarbonate with an aqueous coating slurry containing, as a dispersoid of the aqueous coating slurry, at least one coating agent selected from the group consisting of coating agents belonging to groups (A) or (B) and an aqueous coating solution containing, as a solute of the aqueous coating solution, at least one coating agent selected from the group consisting of coating agents belonging to the other groups (A) or (B).

Further, the present invention relates to the stable sodium percarbonate which is produced by the process according to the present invention.

Namely, the stable sodium percarbonate according to the present invention includes the following embodiments:

(1) A stable sodium percarbonate coated with a coating agent selected from the group (A) consisting of boric acids, borates and alkali metal silicates and a coating agent selected from the group (B) consisting of carbonates, hydrogencarbonates and sulfates, and at least one coating agent selected from the group consisting of coating agents belonging to groups (A) and (B) being used in the form of an aqueous coating slurry thereof;

(2) A stable sodium percarbonate coated with an aqueous coating slurry comprising a coating agent selected from the group (A) consisting of boric acids, borates and alkali metal silicates, a coating agent selected from the group (B) consisting of carbonates, hydrogencarbonates and sulfates, and water, and having a water content of 30 to 90% by weight based on the entire quantity of the aqueous coating slurry, and at least one coating agent selected from the group consisting of coating agents belonging to groups (A) and (B) being used as a dispersoid in the aqueous coating slurry;

(3) A stable sodium percarbonate coated with an aqueous coating slurry containing, as a dispersoid of the aqueous coating slurry, at least one coating agent selected from the group consisting of coating agents belonging to group (A), that is, boric acids, borates and alkali metal silicates, or coating agents belonging to group (B), that is, carbonates, hydrogencarbonates and sulfates, and an aqueous coating solution containing, as a solute of the aqueous coating solution, at least one coating agent selected from the group consisting of coating agents belonging to the other groups (A) or (B); and (4) A stable sodium percarbonate coated with a coating agent composition(s) containing at least one coating agent selected from the group (A) consisting of boric acids, borates and alkali metal silicates and at least one coating agent selected from the group (B) consisting of carbonates, hydrogencarbonates and sulfates, and at least one of the coating agent composition(s) being in the form of an aqueous coating slurry of at least one coating agent selected from the group consisting of coating agents belonging to groups (A) and (B).

Furthermore, the present invention relates to a bleach detergent composition comprising detergent component particles containing a surfactant as an essential component and the stable sodium percarbonate which is produced by the process according to the present invention.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Detailed Description of the Invention

Sodium percarbonate usable in the present invention is produced by an ordinary method such as a wet method wherein sodium carbonate is reacted with hydrogen peroxide in an aqueous medium and the reaction product is recovered by filtration and dried; or a dry method wherein an aqueous sodium carbonate solution and hydrogen peroxide are sprayed to react them in a dry stream and the reaction mixture is directly dried. A silicate, an organic chelating agent, a phosphate, a polyacrylate, a magnesium salt, etc., can be contained in the sodium percarbonate crystal particles produced by the above method since they may be added in the course of the reaction of sodium carbonate with hydrogen peroxide or after the filtration or drying of sodium percarbonate, depending on the purpose.

The boric acids usable as the coating agent belonging to group (A) in the present invention are methaboric acid ($HBO_2$), orthoboric acid ($H_3PO_3$) and so on.

The borates usable as the coating agent belonging to group (A) in the present invention are preferably sodium borates such as sodium tetraborate (borax, $Na_2O.2B_2O_3$), sodium octaborate ($Na_2O.4B_2O_3$), sodium pentaborate ($Na_2O.5B_2O_3$) and sodium metaborate ($NaBO_2$). The particularly preferred borate is sodium metaborate. These borates may be in the form of an anhydride or a hydrate without any particular limitation.

In the alkali metal silicates usable as the coating agent belonging to group (A) in the present invention, the sodium silicates are those represented by the formula: $Na_2O.nSiO_2.xH_2O$ (wherein n is 0.5 to 4 and represents the molar ratio of $SiO_2$ to $Na_2O$). Examples of sodium silicates include crystalline sodium silicates, e.g. sodium orthosilicates ($2Na_2O.SiO_2.xH_2O$, n=0.5), sodium sesquisilicates ($3Na_2O.2SiO_2.xH_2O$, n=0.67) and sodium metasilicates ($Na_2O.SiO_2.xH_2O$, n=1), and amorphous sodium silicates ($Na_2O.nSiO_2$, n=1 to 4). These sodium silicates are marketed as aqueous solutions thereof and as powders obtained by drying the aqueous solutions.

Although a boric acid, a borate and/or an alkali metal silicate is used as the coating agent belonging to group (A) in the present invention, the combination use of the boric acid and/or the borate with the alkali metal silicate is preferable. In such a case, the weight ratio of the sum of the boric acid and the borate to the alkali metal silicate is preferably 20/1 to 1/1, still preferably 10/1 to 1/1.

In the present invention, borates and alkali metal silicates are preferably used as the coating agents belonging to group (A).

Examples of the carbonates usable as the coating agent belonging to group (B) in the present invention include sodium carbonate, potassium carbonate, magnesium carbonate and calcium carbonate, among which sodium carbonate is preferred and the anhydrous form thereof is particularly preferred.

Examples of the hydrogencarbonates usable as the coating agent belonging to group (B) in the present invention include sodium hydrogencarbonate and potassium hydrogencarbonate, preferred being sodium hydrogencarbonate.

Examples of the sulfates usable as the coating agent belonging to group (B) in the present invention include sodium sulfate, potassium sulfate, magnesium sulfate and calcium sulfate, with the preferred being sodium sulfate and magnesium sulfate.

As the coating agent belonging to group (B), those having an average particle diameter of 3 to 500 μm are preferable, with those having an average particle diameter of 10 to 500 μm being particularly preferable, with those having an average particle diameter of 10 to 200 μm being most preferable.

The weight ratio of the coating agent belonging to group (A) to the coating agent belonging to group (B) is preferably 1/20 to 20/1, still preferably 1/10 to 10/1 and particularly preferably 1/5 to 5/1.

The total amount of the coating agents belonging to groups (A) and (B) is preferably 0.1 to 30% by weight, still preferably 1 to 20% by weight, and particularly preferably 2 to 20% by weight based on the amount of sodium percarbonate.

The present invention is characterized by slurrying at least one coating agent selected from the group consisting of coating agents belonging to groups (A) and (B) and applying the slurry to the surface of sodium percarbonate. Namely, although the coating agent belonging to group (A) and the coating agent belonging to group (B) are employed for the surface coating of sodium percarbonate in the present invention, at least one coating agent is employed in the form of an aqueous coating slurry thereof. Therefore, the slurry according to the present invention comprises a coating agent belonging to group (A) and/or a coating agent belonging to group (B) and water, and at least one coating agent selected from the group consisting of coating agents belonging to groups (A) and (B) is present in the form of fine solid particles as a dispersoid in the aqueous solution of the coating agent belonging to group (A) and/or the coating agent belonging to group (B), and the slurry maintains its fluidity.

In particular, the slurry according to the present invention can be defined as follows:

(1) Since the amount of the coating agent exceeds its saturation point, the coating agent is dispersed in an aqueous solution of the coating agent;

(2) Since the coating agent does not completely dissolve, it is still dispersed in an aqueous solution of the coating agent; or (3) Fine solid particles of an undissolved coating agent and more fine solid particles of the coating agent precipitated from the aqueous solution thereof by stimulation due to a temperature change, stirring, etc., or with a change in time, are dispersed in the aqueous solution of the coating agent.

In any event, the slurry maintains its fluidity.

The amount of the solid dispersoid in the slurry is usually at least 1% by weight, preferably 2 to 50% by weight and still preferably 2 to 20% by weight based on the entire quantity of the slurry. The water content of the slurry in such a case is 30 to 90% by weight, preferably 50 to 70% by weight based on the entire quantity of the slurry. When a slurry having a water content of below 30% by weight is used, no effect of the present invention can be obtained and, in addition, the homogeneous addition of the slurry to the starting sodium percarbonate becomes difficult, which is disadvantageous from the viewpoint of workability.

To produce a slurry suitable for use in the present invention, the smaller the particle diameter of the powdery coating agent, the better the results. In particular, when the coating agent belonging to group (B) is employed as a dispersoid, the average particle diameter of the powdery coating agent belonging to group (B), which is used to produce an aqueous coating slurry thereof, is preferably in the range of 3 to 500 $\mu$m, still more preferably in the range of 10 to 500 $\mu$m, and particularly, preferably in the range of 10 to 200 $\mu$m, from the viewpoint of workability.

In slurrying the coating agent of the present invention, fine solid particles of the coating agent are produced by kneading or shearing by high-speed rotation, with water being used as the solvent. However, the slurrying method is not limited as long as more homogeneous and fine solid particles of the coating agent can be produced.

The coating agent composition, such as a coating slurry, a coating solution and the like, usable in the present invention for coating the sodium percarbonate may contain a sequestering agent such as ethylenediaminetetraacetate, nitrilotriacetate or hydroxyethyliminodiacetate. The amount of the sequestering agent present in the coating agent composition(s) is desirably 0.01 to 3% by weight based on the amount of sodium percarbonate.

In the surface coating step of the sodium percarbonate according to the present invention, a coating slurry, in which at least one coating agent selected from the group consisting of the coating agents belonging to groups (A) and (B) is used as a dispersoid, is employed. Therefore, the coating agent belonging to group (A) and the coating agent belonging to group (B) can be applied to sodium percarbonate, simultaneously or separately. For example, a coating agent belonging to groups (A) or (B) can be applied to the sodium percarbonate as a slurry and a coating agent belonging to other groups (A) or (B) can be applied in any form other than a slurry, such as a solution. However, from the viewpoint of the performance of the resultant stable sodium percarbonate and workability, coating agents belonging to groups (A) and (B) are advantageously applied to the sodium percarbonate simultaneously. For example, the surface coating of sodium percarbonate is preferably conducted with a coating slurry comprising the coating agents belonging to groups (A) and (B) and water, having a water content of 30 to 90% by weight based on the entire quantity of the coating slurry and containing, as a dispersoid of the coating slurry, at least one coating agent selected from the group consisting of the coating agents belonging to groups (A) and (B). In this case, the coating agent(s) other than the one present as a dispersoid is dissolved in water.

The method of coating sodium percarbonate is not particularly limited in the present invention. For example, coated sodium percarbonate can be easily produced by feeding sodium percarbonate in a batchwise or continuous type stirred mixer, slowly adding a coating slurry comprising coating agents belonging to groups (A) and (B) and water to the sodium percarbonate while stirring the sodium percarbonate and drying the resultant mixture with hot air. Alternatively, sodium percarbonate is fed to a batchwide or continuous type stirred mixer, a coating slurry comprising a coating agent belonging to groups (A) or (B) and water and a coating solution comprising a coating agent belonging to the other groups (A) or (B) and water are slowly added to the sodium percarbonate while stirring the sodium percarbonate, and the resultant mixture is dried with hot air. In this case, the order of the addition of the coating slurry and the coating solution is not limited.

The average particle diameter of the coated sodium percarbonate particles is generally 100 to 2,000 $\mu$m, and preferably, depending on the purpose, 250 to 1,000 $\mu$m or 300 to 1200 $\mu$m. The average particle diameter of the coated sodium percarbonate particles of the present invention is preferably 300 to 1200 $\mu$m from the viewpoints of the storability and solubility. When the average particle diameter is larger than 1200 $\mu$m, the dissolution time necessitated for its use is too long to sufficiently exhibit the bleaching effect and, on the contrary, when it is smaller than 300 $\mu$m, the storability thereof tends to be influenced by contact with particles of components other than the coated sodium percarbonate.

It is also preferred that the particle size distribution of the coated sodium percarbonate particles be within a narrow range and that the weight fraction of at least 30% by weight of the particles be within the range of the average particle diameter ±200 $\mu$m.

When stable sodium percarbonate of the present invention, that is, coated sodium percarbonate, is incorporated into a bleach detergent composition, the stability of the stable sodium percarbonate is equivalent or superior to that of the sodium perborate, even under severe conditions, namely when a decomposition catalyst such as zeolite is present. This fact is very surprising, since such a stability could not be attained in the prior art. Thus it has become possible to obtain a bleach detergent composition containing stable sodium percarbonate, and the present invention provides a bleach detergent composition comprising detergent component particles containing a surfactant as an essential component and the stable sodium percarbonate produced by the process according to the present invention.

The stable sodium percarbonate content in a bleach detergent composition is 1 to 99% by weight based on the entire quantity of the bleach detergent composition, and the surfactant content does not exceed 60% by weight based on the entire quantity of the detergent components. The detergent components include all of the components other than the bleaching agents such as stable sodium percarbonate in the bleach detergent composition. It is preferable that the surfactant content is 5 to 59.4% by weight and the stable sodium percarbonate content is 1 to 40% by weight based on the entire quantity of the bleach detergent composition. It is still preferable that the surfactant content is 10 to 50% by weight and the stable sodium percarbonate content is 2 to 20% by weight based on the entire quantity of the bleach detergent composition.

Among surfactants, the nonionic surfactants include polyoxyethylene alkyl ethers, polyoxyethylene alkylphenyl ethers, polyoxyethylene sorbitan/fatty acid esters, polyoxyethylene sorbitan/fatty acid esters, polyoxyethylene sorbitol/fatty acid esters, polyethylene glycol/fatty acid esters, polyoxyethylene polyoxypropylene alkyl ethers, polyoxyethylene castor oil, polyoxyethylene alkylamines, glycerol/fatty acid esters, higher fatty acid alkanolamides, alkyl glucosides and alkylamine oxides. It is desirable to use, as the main nonionic surfactant, polyoxyethylene alkyl ethers comprising a straight chain or branched, primary or secondary alcohol having 10 to 15 carbon atoms, preferably 12 to 14 carbon atoms and having an average molar number of added ethylene oxide of 5 to 15, preferably 6 to 12 and still preferably 6 to 10.

Examples of the anionic surfactants include alkylbenzenesulfonates, alkyl or alkenyl ether sulfates, alkyl or alkenyl sulfates, α-olefin-sulfonates, salts or ester salts of α-sulfofatty acids, alkyl or alkenyl ether carboxylic acid salts, amino acid surfactants, N-acylamino acid surfactants and alkyl or alkenyl phosphates or salts thereof.

Amphoteric surfactants include, for example, carboxy or sulfobetaine amphoteric surfactants. The cationic surfactants include, for example, quaternary ammonium salts such as di(hardened beef tallow alkyl)-dimethylammonium chlorides, quaternary ammonium salts described in EP No. 239910, and alkylamines and hydrochloric acids thereof (such as alkylamines described in Japanese Patent publication-A No. 108174/1992).

A bleach activator can also be incorporated into the bleach detergent composition of the present invention. The bleach activators include organic peracid precursors such as polyhydric alcohol acetates, e.g. glucose pentaacetate, sorbitol hexaacetate and sucrose octaacetate; N-acetyl compounds such as tetra-acetylethylenediamine and tetraacetylglycoluril; organic acid anhydrides such as phthalic anhydride and succinic anhydride; bleach activators described in Japanese Patent Publication-B No. 12520/1988 and bleach activators described in Japanese Patent Publication-A No. 17196/1991.

When the stable sodium percarbonate content is above 40% by weight based on the entire quantity of the bleach detergent composition, the bleach activator content is 1 to 50% by weight, preferably 5 to 40% by weight based on the entire quantity of the bleach detergent composition. When the stable sodium percarbonate content is 1 to 40% by weight based on the entire quantity of the bleach detergent composition, the bleach activator is incorporated therein in an amount of 0.1 to 20% by weight, preferably 0.5 to 10% by weight based on the entire quantity of the bleach detergent composition.

The stability of the stable sodium percarbonate according to the present invention in the bleach detergent composition containing the bleach activator is equal or superior to that of sodium perborate.

In addition, by incorporating a bleach stabilizer selected from the group consisting of the following compounds (a) to (c) into the bleach detergent composition according to the present invention as one of detergent components, factors which deactivate sodium percarbonate are avoided and thus the stabilization effect of the stable sodium percarbonate is further improved:

a) carboxylic polymers (having average molecular weight of 2,000 to 200,000 and a carboxyl group content of at least 30 molar %),
b) organic phosphonic acids or salts thereof, and
c) aminopolycarboxylic acids having a stability constant in the presence of Cu of at least 3 or salts thereof.

A carboxyl group content of at least 30 molar % means that the polymer has carboxyl groups in an amount of 0.3 or more per unit monomer.

The bleach stabilizer content is 0.1 to 15%, preferably 1 to 10%, based on the entire quantity of the detergent components.

Components which can be incorporated into the bleach detergent composition of the present invention include the following:

[I] aluminosilicates (1) crystalline aluminosilicates (zeolites) of the following formula:

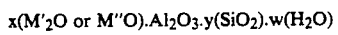

wherein M' represents an alkali metal atom, M" represents an alkaline earth metal atom replaceable with calcium, and x, y and w represent molar numbers of the respective components, which are usually as follows: $0.7 \leq x \leq 1.5$, $0.8 \leq y \leq 6$ and w is an arbitrary positive number, Among crystalline aluminosilicates represented by the above formula, those of the following general formula are particularly preferable as detergent builders.

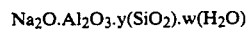

wherein y represents a number of 1.8 to 3.0 and w represents a number of 1 to 6, and (2) amorphous aluminosilicates of the following formula:

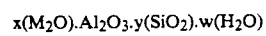

wherein M represents sodium and/or potassium atom, and x, y and w each represent a molar number of the component which is in the following numerical range:
$0.7 < x \leq 1.2$
$1.6 \leq y \leq 2.8$
w: an arbitrary positive number.

Although such an aluminoslicate accelerates the decomposition of sodium percarbonate, the stability of stable sodium percarbonate provided by the present invention can be maintained on a level equal to or higher than that of sodium perborate in the presence of the aluminosilicate.

[2] detergent builders other than aluminosilicates

Other detergent builders include, for example, phosphates such as tripolyphosphates and pyrophosphates; aminotri(methylenephosphonic acid), 1-hydroxyethylidene-1,1-diphosphonic acid, ethylenediaminetetra(methylenephosphonic acid), diethylenetriaminepenta(methylenephosphonic acid) and salts thereof; salts of phosphonocarboxylic acids such as 2-phosphonobutane-1,2-dicarboxylic acid; salts of amino acids such as aspartic acid and glutamic acid; and aminopolyacetates such as nitrilotriacetates and ethylenediaminetetraacetates. Detergent builders further include, for example, polyelectrolytes such as polyacrylic acid and polyaconitic acid;

nondissociating polymers such as polyethylene glycol, polyvinyl alcohol and polyvinylpyrrolidone; divalent metal ion scavengers such as organic acids and salts thereof, e.g., polyacetal carboxylic acid polymers described in Japanese Patent Publication-A No. 52196/1979, diglycolic acid and hydroxy carboxylic acid salts; alkaline salts or inorganic electrolytes such as silicates, carbonates and sulfates; and antiredeposition agents such as layer silicates described in Japanese Patent Publication-A No. 227895/1985, polyvinylpyrrolidone and carboxymethylcellulose.

[3] sequestering agents for heavy metals

They include, for example, hydroxyiminodiacetic acid.

[4] bleach stabilizers

They include, for example, ethylenediaminetetraacetic acid.

[5] enzymes

They include, for example, protease, amylase, lipase and cellulase.

[6] anticaking agents

They include, for example, p-toluenesulfonates, sulfosuccinates, talc and calcium silicate.

[7] antioxidants

They include, for example, tert-butylhydroxytoluene and distyrenated cresol.

[8] fluorescent dyes; bluing agents; and perfumes.

These additives may be incorporated into the bleach detergent composition according to the desired purpose, without any particular limitation.

The bleach detergent composition of the present invention is usually produced by producing detergent component particles by the use of components other than coated sodium percarbonate, and then mixing the detergent component particles with coated sodium percarbonate particles.

To reduce the influence of the contact of the detergent component particles with the coated sodium percarbonate particles on the storability of the coated sodium percarbonate particles, it is desirable that the particle diameter of the coated sodium percarbonate particles be as equal as possible to that of the detergent component particles in the bleach detergent composition according to the present invention. Therefore, the average particle diameter of the detergent component particles is preferably in the range of 250 to 900 $\mu$m, and as close as possible to the average particle diameter of the coated sodium percarbonate particles. It is also preferred that the particle size distributions of both the coated sodium percarbonate particles and the detergent component particles be small and that the weight fraction of at least 30% by weight of the particles be within the range of the average particle diameter of particles constituting the bleach detergent composition ±200 $\mu$m. In addition, the water content of the detergent component particles is desirably 2 to 8% by weight, still more desirably 3 to 6% by weight.

When the particle diameter of the detergent component particles per se is within the desirable range, these particles can be used as they are. When they are too large, they may be pulverized, and when they are too small, they may be granulated by a known method. Further they may be sized, if necessary. The detergent component particles are not limited to only one kind. It is also possible to use, as detergent component particles, a mixture of two or more kinds of detergent component particles which are granulated separately and each of which contain part of the detergent components.

The coated sodium percarbonate of the present invention has a particularly high stability in the above-described bleach detergent composition according to the present invention and such a bleach detergent composition exhibits an excellent bleach detergent power even after storage for a long period of time.

Although the mechanism in the present invention has not yet been elucidated, it is conceivably as follows: When sodium percarbonate is coated with a coating agent in the form of a solution only, this solution penetrates into the crystals through gaps between the crystals on the sodium percarbonate surface to reduce the efficiency of coating the surfaces of the crystals, that is the surfaces of sodium percarbonate particles. On the other hand, when only a powdery coating is directly applied, the formed coating layers on the surfaces of sodium percarbonate particles are uneven, since it is easily affected by the particle diameter of the powder, that is a coating agent. However, when a slurry containing, as the dispersoid, a coating agent in the form of finer particles and having a high fluidity is spread on the surface of sodium percarbonate as in the present invention, the coating agent is applied on the sodium percarbonate surface, and therefore a coating layer is formed more uniformly and efficiently on the sodium percarbonate surface to remarkably improve the storability of the resultant coated sodium percarbonate.

The coated sodium percarbonate produced by the present invention can be incorporated into a bleaching agent composition or a detergent composition, particularly a detergent composition containing zeolite, to exhibit a stability higher than that of ordinary ones. The stability of the coated sodium percarbonate is equal or superior to that of sodium perborate. Namely, the bleach detergent composition according to the present invention exhibits a stability with respect to its bleach detergent power equal or superior to bleach detergent compositions containing sodium perborate as a bleaching agent. The present invention is thus extremely advantageous from an industrial viewpoint.

Although the amounts of the coating agents and the amount or the like of the solvent were variously limited in order to completely dissolve these coating agents in the processes heretofore employed which used only a coating agent solution, such limitations are not made at all in the present invention.

EXAMPLES

The following Examples will further illustrate the present invention, which by no means limit the present invention.

Starting sodium percarbonate

Wet sodium percarbonate obtained by reacting hydrogen peroxide with sodium carbonate in an aqueous solution was dried with hot air to obtain the starting sodium percarbonate.

EXAMPLES 1 TO 6

4.5 kg of sodium percarbonate was fed into a stirred mixer (batchwise type). A coating slurry as a coating agent composition was prepared by feeding an aqueous solution of 5.5% by weight, based on sodium percarbonate, of sodium metaborate tetrahydrate (coating agent of group (A)) in 500 g of water and each of the coating agents belonging to group (B) listed in Table 1 (addition rate: based on sodium percarbonate) to a kneader, and mixing them. The coating slurry thus obtained was dropped into the stirred mixer over a period of 30 seconds while stirring the sodium percarbonate at 250 rpm. After the completion of the dropping, the resultant mixture was stirred for 2.5 min, followed by fluidization drying with hot air. Thus, coated sodium percarbonate was obtained.

Each coated sodium percarbonate thus obtained was subjected to the test of storage stability in the presence of zeolite. The results thus obtained are given in Table 1. The storage stability test in the presence of zeolite was conducted as described below.

Test method for storage stability in the presence of zeolite 1.0 g of each sample (a mixture of 0.90 g of the coated sodium percarbonate with 0.1 g of a marketed zeolite) was put in a 50-ml plastic container. The container was capped with a cap having pinholes and then left to stand at 50° C. and at 70% RH for 48 hours to determine the residual available oxygen content according to the formula given below. The available oxygen content was determined by the 0.1N potassium permanganate titration method.

Residual available oxygen content (%) =

{(available oxygen content after storage)/

(available oxygen content before storage)} × 100.

TABLE 1

| Ex. No. | Kind of coating agent belonging to group (B) | State of coating agent composition | Addition rate of coating agent of group (B) (wt. %) | Residual available oxygen content (%) |
|---|---|---|---|---|
| 1 | soda ash (av. particle diam.: 100 μm) | slurry | 3 | 89 |
| 2 | soda ash (av. particle diam.: 100 μm) | slurry | 5 | 92 |
| 3 | sodium hydrogencarbonate (av. particle diam.: 100 μm) | slurry | 3 | 87 |
| 4 | sodium hydrogencarbonate (av. particle diam.: 100 μm) | slurry | 5 | 91 |
| 5 | sodium sulfate (av. particle diam.: 150 μm) | slurry | 5 | 88 |
| 6 | magnesium sulfate (av. particle diam.: 100 μm) | slurry | 3 | 90 |

COMPARATIVE EXAMPLES 1 to 3 AND REFERENTIAL EXAMPLE 1

4.5 kg of sodium percarbonate was fed into a stirred mixer (batchwise type). An aqueous solution obtained by dissolving 5.5% by weight of sodium metaborate tetrahydrate (coating agent of group (A)) and a coating agent(s) specified in Table 2 in 650 g of water at 50° C. was dropped into the stirred mixer over a period of 30 seconds while stirring the sodium percarbonate at 250 rpm. After the completion of the dropping, the resultant mixture was stirred for 2.5 minutes, followed by fluidization drying with hot air. Thus, coated sodium percarbonate was obtained. The amount of the coating agent was given in terms of % by weight based on sodium percarbonate.

Each coated sodium percarbonate thus obtained was subjected to the test of storage stability in the presence of zeolite in the same manner as that of the Examples 1 to 6. The results thus obtained are given in Table 2. The result of the storage stability test in the presence of zeolite of a marketed sodium perborate (manufactured by Interox) is also given as Referential Example 1.

TABLE 2

| Comp. Ex. No. | Coating agent(s) (kind and addition rate of coating agent) | | State of coating agent composition | Residual available oxygen content (%) |
|---|---|---|---|---|
| | Group (A) | Group (B) | | |
| 1 | — | 5% of soda ash | homogeneous solution | 78 |
| 2 | 1.5% of JIS No. 3 sodium silicate | — | homogeneous solution | 80 |
| 3 | 1.5% of JIS No. 3 sodium silicate | 5% of soda ash | homogeneous solution | 84 |
| Ref. Ex. 1 | marketed sodium perborate | | | 91 |

COMPARATIVE EXAMPLES 4 TO 8

4.5 kg of sodium percarbonate was fed into a stirred mixer (batchwise type) and stirred at 250 rpm. 650 g of water was added thereto to obtain wet sodium percarbonate. Then 4.1% by weight (corresponding to 5.5% by weight of sodium metaborate tetrahydrate) of sodium metaborate dihydrate (average particle diameter: 150 μm) (coating agent of group (A)) and a powdery coating agent(s) specified in Table 3 were added to the wet sodium percarbonate over a period of 30 seconds while stirring the wet sodium percarbonate at 250 rpm. The resultant mixture was further stirred for 2.5 minutes and fluidization-dried with hot air to obtain coated sodium percarbonate. The amount of the coating agent was given in terms of % by weight based on sodium percarbonate.

Each coated sodium percarbonate thus obtained was subjected to the test of storage stability in the presence of zeolite in the same manner as that of the Examples 1 to 6. The results thus obtained are given in Table 3.

TABLE 3

| Comp. Ex. No. | Coating agent(s) (kind and addition rate of coating agent) | | Residual available oxygen content (%) |
|---|---|---|---|
| | Group (A) | Group (B) | |
| 4 | — | 5% of soda ash (av. particle diam.: 100 μm) | 80 |
| 5 | — | 3% of sodium hydrogencarbonate (av. particle diam.: 100 μm) | 80 |
| 6 | 1% of sodium silicate powder (av. particle diam.: 110 μm) | — | 77 |
| 7 | 1% of sodium silicate powder (av. particle diam.: 110 μm) | 5% of soda ash (av. particle diam.: 100 μm) | 82 |
| 8 | 1% of sodium sili- | 3% of magnesium sulfate | 78 |

TABLE 3-continued

| Comp. Ex. No. | Coating agent(s) (kind and addition rate of coating agent) | | Residual available oxygen content (%) |
|---|---|---|---|
| | Group (A) | Group (B) | |
| | cate powder (av. particle diam.: 110 μm) | (av. particle diam.: 100 (μm) | |

EXAMPLES 7 TO 9

4.5 kg of sodium percarbonate was fed into a stirred mixer (batchwise type). A coating slurry was prepared by feeding an aqueous solution of 8% by weight, based on sodium percarbonate, of JIS No. 3 sodium silicate (coating agent of group (A)) in 450 g of water and each of the coating agents belonging to group (B) listed in Table 4 (addition rate: based on sodium percarbonate) to a kneader, and mixing them. The coating slurry thus obtained was dropped into the stirred mixer over a period of 30 seconds while stirring the sodium percarbonate at 250 rpm. After the completion of the droping, the resultant mixture was stirred for 2.5 minutes, followed by fluidization drying with hot air. Thus, coated sodium percarbonate was obtained.

Each coated sodium percarbonate thus obtained was subjected to the test of storage stability in the presence of zeolite in the same manner as that of the Examples 1 to 6. The results thus obtained are given in Table 4.

TABLE 4

| Ex. No. | Kind of coating agent belonging to group (B) | State of coating agent composition | Addition rate of coating agent of group (B) (wt. %) | Residual available oxygen content (%) |
|---|---|---|---|---|
| 7 | soda ash (av. particle diam.: 100 μm) | slurry | 5 | 89 |
| 8 | sodium hydrogencarbonate (av. particle diam.: 100 μm) | slurry | 5 | 88 |
| 9 | magnesium sulfate (av. particle diam.: 100 μm) | slurry | 3 | 88 |

EXAMPLES 10 TO 19

4.5 kg of sodium percarbonate was fed into a stirred mixer (batchwise type). A coating slurry was prepared by feeding an aqueous solution of 5.5% by weight, based on sodium percarbonate, of sodium metaborate tetrahydrate (coating agent of group (A)) and 1.5% by weight, based on sodium percarbonate, of JIS No. 3 sodium silicate (coating agent of group (A)) in 550 g of water and each of the coating agents belonging to group (B) listed in Table 5 (addition rate: based on sodium percarbonate) to a kneader, and mixing them. The coating slurry thus obtained was dropped into the stirred mixer over a period of 30 seconds while stirring the sodium percarbonate at 250 rpm. After the completion of the dropping, the resultant mixture was stirred for 2.5 minutes, followed by fluidization drying with hot air. Thus, coated sodium percarbonate was obtained.

Each coated sodium percarbonate thus obtained was subjected to the test of storage stability in the presence of zeolite in the same manner as that of the Examples 1 to 6. The results thus obtained are given in Table 5.

TABLE 5

| Ex. No. | Kind of coating agent belonging to group (B) | State of coating agent composition | Addition rate of coating agent of group (B) (wt. %) | Residual available oxygen content (%) |
|---|---|---|---|---|
| 10 | soda ash (av. particle diam.: 100 μm) | slurry | 1 | 89 |
| 11 | soda ash (av. particle diam.: 100 μm) | slurry | 3 | 94 |
| 12 | soda ash (av. particle diam.: 100 μm) | slurry | 5 | 96 |
| 13 | soda ash (av. particle diam.: 100 μm) | slurry | 10 | 96 |
| 14 | soda ash (av. particle diam.: 300 μm) | slurry | 3 | 93 |
| 15 | soda ash (av. particle diam.: 300 μm) | slurry | 5 | 94 |
| 16 | sodium hydrogencarbonate (av. particle diam.: 100 μm) | slurry | 3 | 92 |
| 17 | sodium hydrogencarbonate (av. particle diam.: 100 μm) | slurry | 5 | 94 |
| 18 | magnesium sulfate (av. particle diam.: 100 μm) | slurry | 3 | 92 |
| 19 | magnesium sulfate (av. particle diam.: 100 μm) | slurry | 5 | 93 |

EXAMPLES 20 TO 23, COMPARATIVE EXAMPLES 9 AND 10 AND REFERENTIAL EXAMPLE 2

100 kg/h of sodium percarbonate was fed into a stirred mixer (continuous type) and stirred at 200 rpm. 400 l of an aqueous solution of 200 kg of sodium metaborate tetrahydrate (coating agent of group (A)) and 50 kg of JIS No. 3 sodium silicate (coating agent of group (A)) was fed into a kneader at a rate of 14.5 l/h (17.8 kg/h) and further each of the powdery coating agents belonging to group (B) listed in Table 6 (addition rate: based on sodium percarbonate) was fed into the kneader at a rate of 3 kg/h (Examples 20 and 23) or 5 kg/h (Examples 21 and 22) to prepare a coating slurry, which was dropped into the stirred mixer at the same rate as that of feeding to the kneader. Each sodium percarbonate thus coated was fluidization-dried with hot air to obtain coated sodium percarbonate.

Coated sodium percarbonates thus obtained and coated sodium percarbonates obtained in Comparative Examples 2 and 3 were subjected to the test of storage stability in the presence of a detergent composition. The results thus obtained are given in Table 6. In Referential Example 2, the stability obtained when a marketed sodium perborate (manufactured by Interox) was used is shown.

The test for the storage stability in the presence of a detergent composition was conducted as described below.

Test method for storage stability in the presence of detergent composition 10 g of each sample (a mixture of 9 g of a commercially available zeolite-containing, phosphorus-free detergent composition with 1 g of the coated sodium percarbonate) was put in a 50-ml plastic container. The container was capped and then left to stand at 40° C. and at 80% RH for 14 days to determine the residual available oxygen content according to the formula given below. The available oxygen content was determined by the 0.1N potassium permanganate titration method.

Residual available oxygen content (%) =

{(available oxygen content after storage)/

(available oxygen content before storage)} × 100

TABLE 6

| Ex. No. | Kind of coating agent belonging to group (B) | State of coating agent composition | Addition rate of coating agent of group (B) (wt. %) | Residual available oxygen content (%) |
| --- | --- | --- | --- | --- |
| 20 | soda ash (av. particle diam.: 100 μm) | slurry | 3 | 91 |
| 21 | soda ash (av. particle diam.: 100 μm) | slurry | 5 | 93 |
| 22 | sodium hydrogencarbonate (av. particle diam.: 100 μm) | slurry | 5 | 92 |
| 23 | magnesium sulfate (av. particle diam.: 100 μm) | slurry | 3 | 91 |
| Comp. Ex. No. | | | | |
| 9 | coated sodium percarbonate of Comp. Ex. 2 | | | 80 |
| 10 | coated sodium percarbonate of Comp. Ex. 3 | | | 81 |
| Ref. Ex. 2 | marketed sodium perborate | | | 90 |

EXAMPLES 24 to 26

100 kg/h of sodium percarbonate was fed into a stirred mixer (continuous type) and stirred at 200 rpm. 12 l/h of water, 5.5 kg/h (5.5% by weight based on sodium percarbonate) of sodium metaborate dihydrate (average particle diameter: 150 μm) (coating agent of group (A)), 1.0 kg/h (1.0% by weight based on sodium percarbonate) of powdery sodium silicate (coating agent of group (A)) and 5 kg/h (Examples 24 and 25) or 3 kg/h (Example 26) of each of the powdery coating agents belonging to group (B) listed in Table 7 (addition rate: based on sodium percarbonate) were fed into a kneader to prepare a coating slurry, which was dropped into the stirred mixer at the same rate as that of feeding to the kneader. Each sodium percarbonate thus coated was fluidization-dried with hot air to obtain coated sodium percarbonate.

Each coated sodium percarbonate thus obtained was subjected to the test of storage stability in the presence of a detergent composition in the same manner as that of the Examples 20 to 23. The results thus obtained are given in Table 7.

TABLE 7

| Ex. No. | Kind of coating agent belonging to group (B) | State of coating agent composition | Addition rate of coating agent of group (B) (wt. %) | Residual available oxygen content (%) |
| --- | --- | --- | --- | --- |
| 24 | soda ash (av. particle diam.: 100 μm) | slurry | 5 | 91 |
| 25 | sodium hydrogencarbonate (av. particle diam.: 100 μm) | slurry | 5 | 90 |
| 26 | magnesium sulfate (av. particle diam.: 100 μm) | slurry | 3 | 90 |

EXAMPLE 27 AND COMPARATIVE EXAMPLES 11 AND 12

4.5 kg of sodium percarbonate was fed into a stirred mixer (batchwise type). A coating agent composition listed below was dropped into the stirred mixer over a period of 30 seconds while stirring the sodium percarbonate at 250 rpm. After the completion of the dropping, the resultant mixture was stirred for 2.5 minutes and then fluidization-dried with hot air. Thus, coated sodium percarbonate was obtained.

Each sodium percarbonate thus coated was subjected to the test of storage stability in the presence of zeolite in the same manner as that of the Examples 1 to 6. The results are given in Table 8.

Coating agent composition

Comparative Example 11: aqueous solution (temp.: 70° C.) prepared by dissolving 6.5% by weight, based on sodium percarbonate, of sodium metaborate tetrahydrate (coating agent of group (A)) and 1% by weight, based on sodium percarbonate, of powdery sodium silicate (coating agent of group (A)) in 600 g of water, Comparative Example 12: aqueous solution (temp.: 70° C.) prepared by dissolving 5% by weight, based on sodium percarbonate, of soda ash (coating agent of group (B)) in the aqueous solution of Comparative Example 11, and Example 27: slurry prepared by dissolving 6.5% by weight, based on sodium percarbonate, of sodium metaborate tetrahydrate (coating agent of group (A)) and 1% by weight, based on sodium percarbonate, of powdery sodium silicate (coating agent of group (A)) in 430 g of water to prepare an aqueous solution (temp.: 70° C.) and then adding 5% by weight, based on sodium percarbonate, of soda ash (coating agent of group (B)) thereto.

TABLE 8

| | Coating agents [Kind and addittion rate (wt. % based on sodium percarbonate)] | | | Water content in coating agent compn. (g) | State of coating agent compn. | Temp. (°C.) | Residual available oxygen (%) |
|---|---|---|---|---|---|---|---|
| | Sodium metaborate tetrahydrate | Sodium silicate | Soda ash | | | | |
| Comp. Ex. 11 | 6.5 | 1 | 0 | 600 | soln. | 70 | 80 |
| Comp. Ex. 12 | 6.5 | 1 | 5 | 600 | soln. | 70 | 84 |
| Ex. 27 | 6.5 | 1 | 5 | 430 | slurry | 70 | 96 |

EXAMPLES 28 AND 29 AND COMPARATIVE EXAMPLES 13 AND 14

Coated sodium percarbonates were produced in the same manner as those of Examples 2 and 12 except that the temperature in the treatment with the slurry was maintained at 50° C. (Examples 28 and 29). These coated sodium percarbonates and coated sodium percarbonates obtained in Comparative Examples 1 and 3 were subjected to the test for storage stability in the presence of zeolite in the same manner as that of Examples 1 to 6. The results are give in Table 9.

TABLE 9

| | Coating agents [Kind and addittion rate (wt. % based on sodium percarbonate)] | | | Water content in coating agent compn. (g) | State of coating agent compn. | Temp. (°C.) | Residual available oxygen (%) |
|---|---|---|---|---|---|---|---|
| | Sodium metaborate tetrahydrate | Soda ash | Sodium silicate | | | | |
| Ex. 28 | 5.5 | 5 | 0 | 500 | slurry | 50 | 92 |
| Ex. 29 | 5.5 | 5 | 1.5 | 550 | slurry | 50 | 96 |
| Comp. Ex. 13 (Comp. Ex. 1) | 5.5 | 5 | 0 | 650 | soln. | 50 | 78 |
| Comp. Ex. 14 (Comp. Ex. 3) | 5.5 | 5 | 1.5 | 650 | soln. | 50 | 84 |

EXAMPLES 30 TO 38 AND COMPARATIVE EXAMPLES 15 TO 19

An aqueous slurry having a solid content of 60% by weight was prepared by mixing detergent components listed in Table 10 in the weight ratio specified in Table 10 and adding water thereto. The aqueous slurry was spray-dried to obtain a powdery detergent composition, which was then fed into an agglomeration granulator and granulated to obtain detergent component particles (in only Example 37, sodium carbonate was not incorporated into the aqueous slurry to be spray-dried, but it was mixed, as a powdery and granulated form, with a powdery detergent composition obtained by spray-drying the aqueous slurry containing detergent components other than sodium carbonate in the step of forming the detergent component particles).

The water content of the detergent component particles thus obtained was determined by heating them at 105° C. for 2 hours and calculating a rate of weight-loss thereof.

90 Parts by weight of the detergent component particles thus obtained were mixed with 10 parts by weight of each sodium percarbonate listed in Table 10 to obtain a bleach detergent composition. The particle size of the resultant particulate composition, that is, the bleach detergent composition consisting essentially of detergent component particles and bleaching agent particles, was determined in terms of weight-average particle diameter, that is, weighted mean particle diameter, with a standard sieve (JIS Z 8801), and the weight fraction in the range of the average particle diameter ±200 μm was calculated from the particle size curve thus obtained.

The storage stability test of each composition was conducted as described below.

The results are given in Table 10.

The stability constants of the bleach stabilizers used in the presence of Cu were as follows:

| | $PK_{Cu}$ |
|---|---|
| sodium poly(α-hydroxyacrylate) (MW: 30,000) (manufactured by Solvay & Cie) | 7.1 |
| Na salt of acrylic acid/maleic acid copolymer (MW: 70,000) (manufactured by BASF) | 6.8 |
| 4Na · EDTA | 6.2 |

Test for storage stability 10 g of each composition was put in a 50-ml plastic container. The container was hermetically capped and then left to stand at 50° C. for 20 days to determine the residual available oxygen content according to the formula given below. The available oxygen content was determined by the 0.1N potassium permanganate titration method.

Residual available oxygen content (%) =

{(available oxygen content after storage)/

(available oxygen content before storage)} × 100

TABLE 10

| | Ex. 30 | Ex. 31 | Ex. 32 | Comp. Ex. 15 | Comp. Ex. 16 | Comp. Ex. 17 | Ex. 33 | Ex. 34 | Ex. 35 | Ex. 36 | Comp. Ex. 18 | Comp. Ex. 19 | Ex. 37 | Ex. 38 |
|---|---|---|---|---|---|---|---|---|---|---|---|---|---|---|
| Detergent component particles | | | | | | | | | | | | | | |
| sodium straight-chain alkyl ($C_{12}$ to $C_{14}$) benzenesulfonate | 20 | 20 | 20 | 20 | 20 | 20 | 20 | 20 | 20 | 20 | 20 | 20 | 5 | 18 |
| sodium alkyl ($C_{12}$ to $C_{18}$) sulfate | 6 | 6 | 6 | 6 | 6 | 6 | 6 | 6 | 6 | 6 | 6 | 6 | — | — |
| sodium α-olefin ($C_{14}$ to $C_{18}$) sulfonate | — | — | — | — | — | — | — | — | — | — | — | — | — | 6 |
| sodium salt of methyl ester of α-sulfo ($C_{12}$ to $C_{18}$) fatty acid | — | — | — | — | — | — | — | — | — | — | — | — | 20 | — |
| soap ($C_{12}$ to $C_{18}$) | 2 | 2 | 2 | 2 | 2 | 2 | 2 | 2 | 2 | 2 | 2 | 2 | 2 | 2 |
| 4A type zeolite | 23 | 23 | 23 | 23 | 23 | 23 | 23 | 23 | — | — | — | — | 23 | 23 |
| sodium tripolyphosphate | — | — | — | — | — | — | — | — | 20 | — | 20 | — | — | — |
| trisodium citrate | — | — | — | — | — | — | — | — | — | 23 | — | 23 | — | — |
| polyethylene glycol (MW: 6,000) | 2 | 2 | 2 | 2 | 2 | 2 | 2 | 2 | 2 | 2 | 2 | 2 | 2 | 2 |
| Na poly(α-hydroxyacrylate) (MW: 30,000) | 1 | 1 | 1 | 1 | 1 | 1 | — | — | 1 | 1 | 1 | 1 | 1 | 1 |
| Na salt of acrylic acid/maleic acid copolymer (monomer ratio: 7/3, MW: 70,000) | — | — | — | — | — | — | 1.5 | — | — | — | — | — | — | — |
| EDTA-4Na | — | — | — | — | — | — | — | 0.8 | — | — | — | — | — | — |
| sodium carbonate | 15 | 15 | 15 | 15 | 15 | 15 | 15 | 15 | 10 | 15 | 10 | 15 | 25 | 22 |
| sodium silicate (JIS No. 2) | 5 | 5 | 5 | 5 | 5 | 5 | 5 | 5 | 5 | 5 | 5 | 5 | — | 5 |
| Glauber's salt | 11.7 | 11.7 | 11.7 | 11.7 | 11.7 | 11.7 | 11.2 | 11.9 | 19.7 | 11.7 | 19.7 | 11.7 | 7.7 | 6.7 |
| fluorescent dye | 0.3 | 0.3 | 0.3 | 0.3 | 0.3 | 0.3 | 0.3 | 0.3 | 0.3 | 0.3 | 0.3 | 0.3 | 0.3 | 0.3 |
| Water in detergent component particles | 4 | 4 | 4 | 4 | 4 | 4 | 4 | 4 | 4 | 4 | 4 | 4 | 4 | 4 |
| Bleaching agent | | | | | | | | | | | | | | |
| coated PC of Ex. 2 (av. particle diam.: 862 μm) | 10 | — | — | — | — | — | 10 | 10 | 10 | 10 | — | — | 10 | 10 |
| coated PC of Ex. 4 (av. particle diam.: 854 μm) | — | 10 | — | — | — | — | — | — | — | — | — | — | — | — |
| coated PC of Ex. 5 (av. particle diam.: 890 μm) | — | — | 10 | — | — | — | — | — | — | — | — | — | — | — |
| coated PC of Comp. Ex. 4 (av. particle diam.: 856 μm) | — | — | — | 10 | — | — | — | — | — | — | — | — | — | — |
| uncoated PC (av. particle diam.: 803 μm) | — | — | — | — | 10 | — | — | — | — | — | 10 | 10 | — | — |
| sodium perborate monohydrate (av. particle diam.: 754 μm) | — | — | — | — | — | 10 | — | — | — | — | — | — | — | — |
| Av. particle diam. of bleach detergent composition (μm) | 462 | 470 | 460 | 477 | 480 | 458 | 480 | 491 | 488 | 490 | 478 | 460 | 501 | 429 |
| Wt. fraction of bleach detergent composition in the range of av. particle diam. ±200 μm (%) | 36.2 | 35.8 | 38.0 | 40.0 | 39.1 | 36.0 | 38.8 | 37.2 | 34.8 | 33.7 | 39.0 | 40.1 | 31.0 | 30.8 |
| Residual available oxygen content (%) | 90.2 | 89.8 | 88.9 | 80.7 | 32.0 | 92.0 | 90.0 | 89.7 | 91.0 | 90.8 | 70.8 | 77.7 | 84.4 | 85.6 | note)
The term "PC" means sodium percarbonate.

EXAMPLES 39 TO 42 AND COMPARATIVE EXAMPLES 20 AND 21

Powdery materials among the components listed in Table 11, that is, 4A type zeolite, sodium carboxymethylcellulose, amorphous silica, sodium carbonate, sodium 1-hydroxyethylidene-1,1-diphosphonate, trisodium isoserinediacetate and fluorescent dye, were fed into an agglomeration granulator in a prescribed weight ratio. Then the liquid nonionic surfactant was slowly introduced thereinto. After mixing and granulation, 88.2 parts by weight of the resultant product, that is, detergent component particles comprising a part of the detergent components, was further mixed with 8 parts by weight of each of the sodium percarbonates, 0.8 part by weight of the enzyme and 3 parts by weight of the bleach activator (tetraacetylethylenediamine or sodium nonanoyloxybenzenesulfonate) to obtain the bleach detergent composition.

The water content of the detergent component particles comprising a part of the detergent components was determined by heating them at 105° C. for 2 hours and calculating a rate of weight-loss thereof. The particle size of the resultant particulate composition, that is, the bleach detergent composition consisting essentially of detergent component particles, bleaching agent particles, enzyme particles and bleach activator particles, was determined in terms of weight-average particle diameter with a standard sieve (JIS Z 8801), and the weight fraction in the range of the average particle diameter ±200 μm was calculated from the particle size curve thus obtained.

The storage stability test was conducted in the same manner as that of Examples 30 to 38 and Comparative Examples 15 to 19.

The results are given in Table 11.

The stability constants of the bleach stabilizers used in the presence of Cu were as follows:

| | $PK_{Cu}$ |
|---|---|
| sodium 1-hydroxyethylidene-1,1-diphosphonate (manufactured by Monsanto) | 6.0 |
| Trisodium isoserinediacetate (manufactured by BASF) | 7.1 |

TABLE 11

|  | Ex. 39 | Comp. Ex. 20 | Comp. Ex. 21 | Ex. 40 | Ex. 41 | Ex. 42 |
| --- | --- | --- | --- | --- | --- | --- |
| Polyoxyethylene/synthetic alcohol ($C_{12}$ to $C_{15}$) ether ($\overline{EOp}$ = 7.5) | 24 | 24 | 24 | 24 | 24 | — |
| Polyoxyethylene dodecyl ether ($\overline{EOp}$ = 8.0) | — | — | — | — | — | 20 |
| 4A type zeolite | 32 | 32 | 32 | 32 | 32 | 30 |
| Na carboxymethylcellulose | 1 | 1 | 1 | 1 | 1 | 1 |
| Amorphous silica | 5 | 5 | 5 | 5 | 5 | 4 |
| Sodium carbonate | 21.1 | 21.1 | 21.1 | 21.0 | 21.1 | 28.1 |
| Na 1-hydroxyethylidene-1,1-diphosphonate (manufactured by Monsanto) | 0.5 | 0.5 | 0.5 | — | 0.5 | 0.5 |
| 3Na Isoserinediacetate (manufactured by BASF) | — | — | — | 0.6 | — | — |
| Fluorescent dye | 0.6 | 0.6 | 0.6 | 0.6 | 0.6 | 0.6 |
| Water in detergent component particles | 4 | 4 | 4 | 4 | 4 | 4 |
| Coated PC of Ex. 2 (av. particle diam.: 862 μm) | 8 | — | — | 8 | 8 | 8 |
| Coated PC of Comp. Ex. 4 (av. particle diam.: 856 μm) | — | 8 | — | — | — | — |
| Uncoated PC (av. particle diam.: 803 μm) | — | — | 8 | — | — | — |
| Enzyme | 0.8 | 0.8 | 0.8 | 0.8 | 0.8 | 0.8 |
| Tetraacetylethylenediamine | 3 | 3 | 3 | 3 | — | 3 |
| Granulated Na nonanoyloxybenzenesulfonate | — | — | — | — | 3 | — |
| Av. particle diam. of bleaching detergent composition (μm) | 392 | 381 | 401 | 395 | 390 | 384 |
| Wt. fraction of bleach detergent composition in the range of av. particle diam. ±200 μm (%) | 53.4 | 60.2 | 50.9 | 54.2 | 53.3 | 54.9 |
| Residual available oxygen content (%) | 88.2 | 78.0 | 30.1 | 89.0 | 88.6 | 86.5 | note)
The term "PC" means sodium percarbonate.

EXAMPLE 43 AND COMPARATIVE EXAMPLES 22 AND 23

The components listed in Table 12 were mixed together to obtain a bleaching composition.

The test for storage stability of the compositions thus obtained was conducted in the same manner as that of Examples 30 to 38 and Comparative Examples 15 to 19. The results are given in Table 12.

TABLE 12

|  | Ex. 43 | Comp. Ex. 22 | Comp. Ex. 23 |
| --- | --- | --- | --- |
| Coated PC of Ex. 2 | 80 | — | — |
| Coated PC of Comp. Ex. 4 | — | 80 | — |
| Uncoated PC | — | — | 80 |
| Sodium carbonate | 10 | 10 | 10 |
| Enzyme (Sabinase 4.0 T, manufactured by NOVO Industri) | 2 | 2 | 2 |
| Sodium sulfate | 8 | 8 | 8 |
| Residual available oxygen content (%) | 96.6 | 94.9 | 90.2 | note)
The term "PC" means sodium percarbonate.

EXAMPLE 44

4.5 kg of sodium percarbonate was fed into a stirred mixer (batchwise type). A coating slurry was prepared by feeding 50 g of water, 6.5% by weight, based on sodium percarbonate, of sodium metaborate tetrahydrate (coating agent of group (A)) and 1.0% by weight, based on sodium percarbonate, of powdery sodium silicate (coating agent of group (A)) to a kneader, and mixing them. The coating slurry thus obtained was dropped into the stirred mixer over a period of 30 seconds while stirring the sodium percarbonate at 250 rpm. Then, an aqueous solution prepared by dissolving 5.0% by weight, based on sodium percarbonate, of soda ash (average particle diameter: 100 μm) (coating agent of group (B)) in 525 g of water (temp.: 60° C.), was dropped into the stirred mixer over a period of 30 seconds while stirring the mixture of sodium percarbonate and the coating slurry at 250 rpm. After the completion of the dropping, the resultant mixture was stirred for 2 minutes, followed by fluidization drying with hot air. Thus, coated sodium percarbonate was obtained.

Each coated sodium percarbonate thus obtained was subjected to the test of storage stability in the presence of zeolite in the same manner as that of the Examples 1 to 6. The residual available oxygen content was 93%.

EXAMPLE 45

4.5 kg of sodium percarbonate was fed into a stirred mixer (batchwise type). An aqueous solution was prepared by dissolving 6.5% by weight, based on sodium percarbonate, of sodium metaborate tetrahydrate (coating agent of group (A)) and 1.0% by weight, based on sodium percarbonate, of powdery sodium silicate (coating agent of group (A)) in 270 g of water (temp.: 70° C.). The aqueous solution (temp.: 70° C.) thus obtained was dropped into the stirred mixer over a period of 30 seconds while stirring the sodium percarbonate at 250 rpm. Then, a coating slurry (temp.: 70° C.), which was prepared by feeding 300 g of water and 5.0% by weight, based on sodium percarbonate, of soda ash (average particle diameter: 100 μm) (coating agent of group (B)) to a kneader and mixing them, was dropped into the stirred mixer over a period of 30 seconds while stirring the mixture of sodium percarbonate and the aqueous solution at 250 rpm. After the completion of the dropping, the resultant mixture was stirred for 2 minutes, followed by fluidization drying with hot air. Thus, coated sodium percarbonate was obtained.

Each coated sodium percarbonate thus obtained was subjected to the test of storage stability in the presence of zeolite in the same manner as that of the Examples 1 to 6. The residual available oxygen content was 95%.

EXAMPLE 46

4.5 kg of sodium percarbonate was fed into a stirred mixer (batchwise type). An aqueous solution was prepared by dissolving 5.0% by weight, based on sodium percarbonate, of soda ash (average particle diameter: 100 μm) (coating agent of group (B)) in 525 g of water (temp.: 60° C.). The aqueous solution (temp.: 60° C.) thus obtained was dropped into the stirred mixer over a period of 30 seconds while stirring the sodium percarbonate at 250 rpm. Then, a coating slurry (temp.: 60°

C.), which was prepared by feeding 50 g of water, 6.5% by weight, based on sodium percarbonate, of sodium metaborate tetrahydrate (coating agent of group (A)) and 1.0% by weight, based on sodium percarbonate, of powdery sodium silicate (coating agent of group (A)) to a kneader and mixing them, was dropped into the stirred mixer over a period of 30 seconds while stirring the mixture of sodium percarbonate and the aqueous solution at 250 rpm. After the completion of the dropping, the resultant mixture was stirred for 2 minutes, followed by fluidization drying with hot air. Thus, coated sodium percarbonate was obtained.

Each coated sodium percarbonate thus obtained was subjected to the test of storage stability in the presence of zeolite in the same manner as that of the Examples 1 to 6. The residual available oxygen content was 93%.

EXAMPLE 47

4.5 kg of sodium percarbonate was fed into a stirred mixer (batchwise type). A coating slurry was prepared by feeding 300 g of water and 5.0% by weight, based on sodium percarbonate, of soda ash (average particle diameter: 100 μm) (coating agent of group (B)) to a kneader, and mixing them. The coating slurry thus obtained was dropped into the stirred mixer over a period of 30 seconds while stirring the sodium percarbonate at 250 rpm. Then, an aqueous solution (temp.: 70° C.) prepared by dissolving 6.5% by weight, based on sodium percarbonate, of sodium metaborate tetrahydrate (coating agent of group (A)) and 1.0% by weight, based on sodium percarbonate, of powdery sodium silicate (coating agent of group (A)) in 270 g of water, was dropped into the stirred mixer over a period of 30 seconds while stirring the mixture of sodium percarbonate and the coating slurry at 250 rpm. After the completion of the dropping, the resultant mixture was stirred for 2 minutes, followed by fluidization drying with hot air. Thus, coated sodium percarbonate was obtained.

Each coated sodium percarbonate thus obtained was subjected to the test of storage stability in the presence of zeolite in the same manner as that of the Examples 1 to 6. The residual available oxygen content was 93%.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A process for producing a stable sodium percarbonate, which comprises a step of treating sodium percarbonate on the surface with at least one coating agent selected from the group (A) consisting of boric acids, borates and alkali metal silicates and at least one coating agent selected from the group (B) consisting of carbonates, hydrogencarbonates and alkali metal or alkaline earth sulfates, wherein at least one coating agent selected from the group consisting of coating agents belonging to groups (A) and (B) is present in the form of an aqueous coating slurry thereof, the total amount of the coating agents belonging to groups (A) and (B) is 0.1 to 30% by weight based on the amount of sodium percarbonate and the weight ratio of coating agents (A) to (B) is between 1/20 and 20/1.

2. The process according to claim 1, wherein the aqueous coating slurry has a water content of 30 to 90% by weight.

3. The process according to claim 1, in which the step(s) of treating sodium percarbonate is effected so that sodium percarbonate is coated with coating agents belonging to groups (A) and (B).

4. The process according to claim 1, wherein a boric acid and/or a borate, and an alkali metal silicate are used as the coating agents belonging to group (A) and wherein the weight ratio of the sum of the boric acid and/or the borate to the alkali metal silicate is 20/1 to 1/1.

5. The process according to claim 1, wherein the coating agent belonging to group (B) as a starting material of the aqueous coating slurry has an average particle diameter of 10 to 500 μm.

6. The process according to claim 1, wherein the coating agent belonging to group (B) as a starting material of the aqueous coating slurry has an average particle diameter of 10 to 200 μm.

7. The process according to claim 1, conducting the step of treating sodium percarbonate on the surface with a coating agent composition(s) selected from the group consisting of:
   (1) an aqueous slurry comprising coating agents belonging to groups (A) and (B), and at least one of the coating agents being a dispersoid of the aqueous slurry,
   (2) an aqueous slurry of a coating agent(s) belonging to group (A) and an aqueous solution of a coating agent(s) belonging to group (B),
   (3) an aqueous slurry of a coating agent(s) belonging to group (B) and an aqueous solution of a coating agent(s) belonging to group (A),
   (4) an aqueous slurry of a coating agent(s) belonging to group (A) and an aqueous slurry of a coating agent(s) belonging to group (B),
   (5) an aqueous slurry of a coating agent(s) belonging to group (A) and powder of a coating agent(s) belonging to group (B), and
   (6) an aqueous slurry of a coating agent(s) belonging to group (B) and powder of a coating agent(s) belonging to group (A), with the proviso that when two coating agent compositions are employed, the order of the treatment with the coating agent compositions is not limited.

8. A stable sodium percarbonate produced by the process according to claim 1.

9. The stable sodium percarbonate according to claim 8, having an average particle diameter of 300 to 1200 μm.

10. The process according to claim 1, conducting the step of treating sodium percarbonate with an aqueous coating slurry containing, as a dispersoid of the aqueous coating slurry, at least one coating agent selected from the group consisting of coating agents belonging to groups (A) or (B) and an aqueous coating solution containing, as a solute of the aqueous coating solution, at least one coating agent selected from the group consisting of coating agents belonging to the other groups (A) or (B).

11. The process according to claim 10, wherein the aqueous coating slurry and/or the aqueous coating solution further contains an effective amount of a sequestering agent.

12. A stable sodium percarbonate produced by the process according to claim 10.

13. The process according to claim 1, conducting the step of treating sodium percarbonate with an aqueous coating slurry which comprises a coating agent belonging to group (A), a coating agent belonging to group (B) and water, has a water content of 30 to 90% by weight based on the entire quantity of the aqueous coating slurry and contains, as a dispersoid of the aqueous coating slurry, at least one coating agent selected from the group consisting of coating agents belonging groups (A) and (B).

14. The process according to claim 13, wherein the coating agent belonging to group (A) is selected from the group consisting of borates and alkali metal silicates.

15. The process according to claim 13, wherein the aqueous coating slurry further contains an effective amount of a sequestering agent.

16. A stable sodium percarbonate produced by the process according to claim 13.

17. A process for producing a stable sodium percarbonate which comprises a surface coating step of sodium percarbonate with an aqueous coating slurry, said surface coating step being conducted with a coating agent selected from the group (A) consisting of boric acids, borates and alkali metal silicates and a coating agent selected from the group (B) consisting of carbonates, hydrogencarbonates and alkali metal or alkaline earth sulfates, wherein at least one coating agent selected from the group consisting of coating agents belonging to groups (A) and (B) is used as a dispersoid of the aqueous coating slurry, the total amount of the coating agents belonging to groups (A) and (B) is 0.1 to 30% by weight based on the amount of sodium percarbonate and the weight ratio of coating agents (A) to (B) is between 1/20 and 20/1.

18. A stable sodium percarbonate produced by coating the percarbonate with a coating agent selected from the group (A) consisting of boric acids, borates and alkali metal silicates and a coating agent selected from the group (B) consisting of carbonates, hydrogencarbonates and alkali metal or alkaline earth sulfates, wherein at least one coating agent selected from the group consisting of coating agents belonging to groups (A) and (B) is used in the form of an aqueous coating slurry thereof, the total amount of the coating agents belonging to groups (A) and (B) is 0.1 to 30% by weight based on the amount of sodium percarbonate and the weight ratio of coating agents (A) to (B) is between 1/20 and 20/1.

19. A stable sodium percarbonate produced by coating the percarbonate with an aqueous coating slurry comprising a coating agent selected from the group (A) consisting of boric acids, borates and alkali metal silicates, a coating agent selected from the group (B) consisting of carbonates, hydrogencarbonates and alkali metal or alkaline earth sulfates, and water, and having a water content of 30 to 90% by weight based on the entire quantity of the aqueous coating slurry, and at least one coating agent selected from the group consisting of coating agents belonging to groups (A) and (B) being used as a dispersoid in the aqueous coating slurry, the total amount of the coating agents belonging to groups (A) and (B) is 0.1 to 30% by weight based on the amount of sodium percarbonate and the weight ratio of coating agents (A) to (B) is between 1/20 and 20/1.

20. A stable sodium percarbonate produced by coating the percarbonate with an aqueous coating slurry containing, as a dispersoid of the aqueous coating slurry, at least one coating agent selected from the group consisting of coating agents belonging to group (A) consisting of boric acids, borates and alkali metal silicates, or coating agents belonging to group (B) consisting of carbonates, hydrogencarbonates and alkali metal or alkaline earth sulfates, and an aqueous coating solution containing, as a solute of the aqueous coating solution, at least one coating agent selected from the group consisting of coating agents belonging to the other groups (A) or (B), the total amount of the coating agents belonging to groups (A) and (B) is 0.1 to 30% by weight based on the amount of sodium percarbonate and the weight ratio of coating agents (A) to (B) is between 1/20 and 20/1.

21. A stable sodium percarbonate produced by coating the percarbonate with a coating agent composition(s) containing at least one coating agent selected from the group (A) consisting of boric acids, borates and alkali metal silicates and at least one coating agent selected from the group (B) consisting of carbonates, hydrogencarbonates and alkali metal or alkaline earth sulfates, and at least one of the coating agent composition(s) being in the form of an aqueous coating slurry of at least one coating agent selected from the group consisting of coating agents belonging to groups (A) and (B), the total amount of the coating agents belonging to groups (A) and (B) is 0.1 to 30% by weight based on the amount of sodium percarbonate and the weight ratio of coating agents (A) to (B) is between 1/20 and 20/1.

22. A bleach detergent composition comprising detergent component particles containing a cleaning effective amount of a surfactant as an essential component and a bleaching effective amount of a stable sodium percarbonate produced by a process which comprises a step of treating sodium percarbonate on the surface with at least one coating agent selected from the group (A) consisting of boric acids, borates and alkali metal silicates and at least one coating agent selected from the group (B) consisting of carbonates, hydrogencarbonates and alkali metal or alkaline earth sulfates, wherein at least one coating agent selected from the group consisting of coating agents belonging to groups (A) and (B) is present in the form of an aqueous coating slurry thereof, the total amount of the coating agents belonging to groups (A) and (B) is 0.1 to 30% by weight based on the amount of sodium percarbonate and the weight ratio of coating agents (A) to (B) is between 1/20 and 20/1.

23. The bleach detergent composition according to claim 22, wherein the detergent component particles have an average particle diameter of 250 to 900 $\mu$m and the stable sodium percarbonate has an average particle diameter of 300 to 1200 $\mu$m.

24. The bleach detergent composition according to claim 22, wherein the surfactant is present in an amount of 5 to 59.4% by weight and the stable sodium percarbonate is present in an amount of 1 to 40% by weight based on the entire quantity of the composition.

25. The bleach detergent composition according to claim 22, wherein the detergent component particles further contain an effective amount of a bleach stabilizer selected from the group consisting of carboxylated polymers having an average molecular weight of 2,000 to 200,000 and a carboxyl group content of at least 30 molar %, organic phosphonic acids, salts of organic phosphonic acids, and aminopolycarboxylic acids having a stability constant in the presence of Cu of at least 3 and salts thereof.

26. The bleach detergent composition according to claim 25, wherein the detergent component particles contain the stabilizer in an amount of 0.1 to 15% by weight based on the entire quantity of the detergent component particles.

27. The bleach detergent composition according to claim 22, which further contains an effective amount of a bleach activator.

28. The bleach detergent composition according to claim 27, wherein the surfactant is present in an amount of 5 to 59.4% by weight, the stable sodium percarbonate is present in an amount of 1 to 40% by weight and the bleach activator is present in an amount of 0.1 to 20% by weight based on the entire quantity of the composition.

29. The bleach detergent composition according to claim 27, which contains the stable sodium percarbonate in an amount of above 40% by weight and the bleach activator in an amount of 1 to 50% by weight based on the entire quantity of the composition.

* * * * *